United States Patent
Argumedo et al.

(10) Patent No.: US 7,515,382 B2
(45) Date of Patent: Apr. 7, 2009

(54) TAPE GUIDE ROLLER WITH ZONED NON-SMOOTH SURFACE

(75) Inventors: Armando Jesus Argumedo, Tucson, AZ (US); Kevin Bruce Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/223,476

(22) Filed: Sep. 8, 2005

(65) Prior Publication Data
US 2007/0053105 A1 Mar. 8, 2007

(51) Int. Cl.
*G11B 15/60* (2006.01)
(52) U.S. Cl. ............... 360/130.21; 242/346.2; 242/615.4
(58) Field of Classification Search ............ 360/130.21, 360/130.2; 242/615.2, 615.4, 346, 346.2
See application file for complete search history.

(56) References Cited

U.S. PATENT DOCUMENTS

| | | | |
|---|---|---|---|
| 3,659,797 A | 5/1972 | Coy | 242/55.19 |
| 4,491,891 A * | 1/1985 | Shiba | 242/346.2 |
| 6,666,805 B2 | 12/2003 | Poorman | 492/35 |
| 6,745,976 B1 | 6/2004 | Marion | 242/615.4 |
| 6,754,033 B1 | 6/2004 | Argumedo et al. | 360/77.12 |
| 6,969,021 B1 * | 11/2005 | Nibarger | 242/346.2 |
| 6,994,293 B1 * | 2/2006 | Coburn | 242/615.2 |
| 2003/0089819 A1 * | 5/2003 | Bloomquist et al. | 242/615.3 |
| 2004/0178302 A1 | 9/2004 | Bloomquist et al. | 242/615.4 |
| 2004/0222327 A1 * | 11/2004 | Hanscom | 242/332 |

* cited by examiner

*Primary Examiner*—William J Klimowicz
(74) *Attorney, Agent, or Firm*—John H. Holcombe

(57) ABSTRACT

A tape guide roller comprises a cylindrical barrel with a cylindrical peripheral surface parallel to a central axis; the cylindrical peripheral surface comprising smooth cylindrical surface zones alternating in the circumferential direction about the cylindrical peripheral surface with non-smooth cylindrical surface zones. The non-smooth cylindrical surface zones may comprise a textured surface, and/or may comprise a grooved surface.

24 Claims, 5 Drawing Sheets

US 7,515,382 B2

TAPE GUIDE ROLLER WITH ZONED NON-SMOOTH SURFACE

FIELD OF THE INVENTION

This invention relates to tape guide rollers for controlling the longitudinal movement or translation of tape along a tape path.

BACKGROUND OF THE INVENTION

Typically, tape guide rollers are needed to control the longitudinal movement of tape along a tape path which varies from a straight line. One example is a tape path for a magnetic tape that extends between tape reels and across a magnetic tape head which is configured to read and/or write magnetic signals with respect to the magnetic tape.

The arrangement of the tape reels is typically such that the tape reels are in the same plane, but are also at angles with respect to the tape path across the magnetic tape head. In addition, the angle of the tape as it is fed from one reel and as it is fed to another reel may be constantly changing. Thus, the tape is wrapped around the tape guide roller to allow longitudinal movement of the tape in which the longitudinal direction of the tape is changed from the direction to or from a tape reel to the tape path across the magnetic tape head.

Typically, such tape guide rollers have smooth cylindrical surfaces on which the tape is wrapped, and may have flanges to maintain the lateral alignment of the tape. Such tape guide rollers may have ball bearings or roller bearings to support the tape guide roller "barrel" and to reduce friction and allow rotation, but also have an intrinsic resistance to spin on their axes due to viscous drag of the bearings. An air film may form between the cylindrical surface and the tape, and due to the tape guide roller's resistance to spin, dissimilar speeds may result between the tape guide roller and the tape. The result is that the edges of the tape may contact a flange of the tape guide roller while at dissimilar speeds. Dissimilar speeds in turn may create the condition that the edges of the tape act like abrasive blades that scar the flanges. Flange scarring may result in transient disturbances to the lateral position of the tape and perhaps prevent a track following servo from correctly following the tracks of the magnetic tape, degrading performance. Dissimilar speeds may also cause excessive production of tape debris.

SUMMARY OF THE INVENTION

A tape guide roller, and a tape translation system, a tape head system and a magnetic tape drive system are provided employing one or more tape guide rollers.

In an embodiment of the present invention, a tape guide roller comprises a cylindrical barrel having a central axis perpendicular to the longitudinal direction of the tape, and having a cylindrical peripheral surface parallel to the central axis; the cylindrical peripheral surface comprising smooth cylindrical surface zones alternating in the circumferential direction about the cylindrical peripheral surface with non-smooth cylindrical surface zones.

In a further embodiment, each of the smooth cylindrical surface zones extends in the circumferential direction a distance greater than a wrap distance of the tape in the circumferential direction.

In another embodiment, each of the non-smooth cylindrical surface zones extends in the circumferential direction a distance less than a wrap distance of the tape in the circumferential direction.

In a still further embodiment, the non-smooth cylindrical surface zones comprise high points of substantially the same radial distance as smooth cylindrical surface zones.

In a further embodiment, the non-smooth cylindrical surface zones comprise a textured surface.

In another embodiment, the non-smooth cylindrical surface zones comprise a grooved surface.

In a still further embodiment, smooth edges completely surround the non-smooth cylindrical surface zones.

In an embodiment of a tape translation system, a tape head system or a magnetic tape drive system with a plurality of tape guide rollers of a tape path, at least an outer two of the tape guide rollers have zoned non-smooth surfaces.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
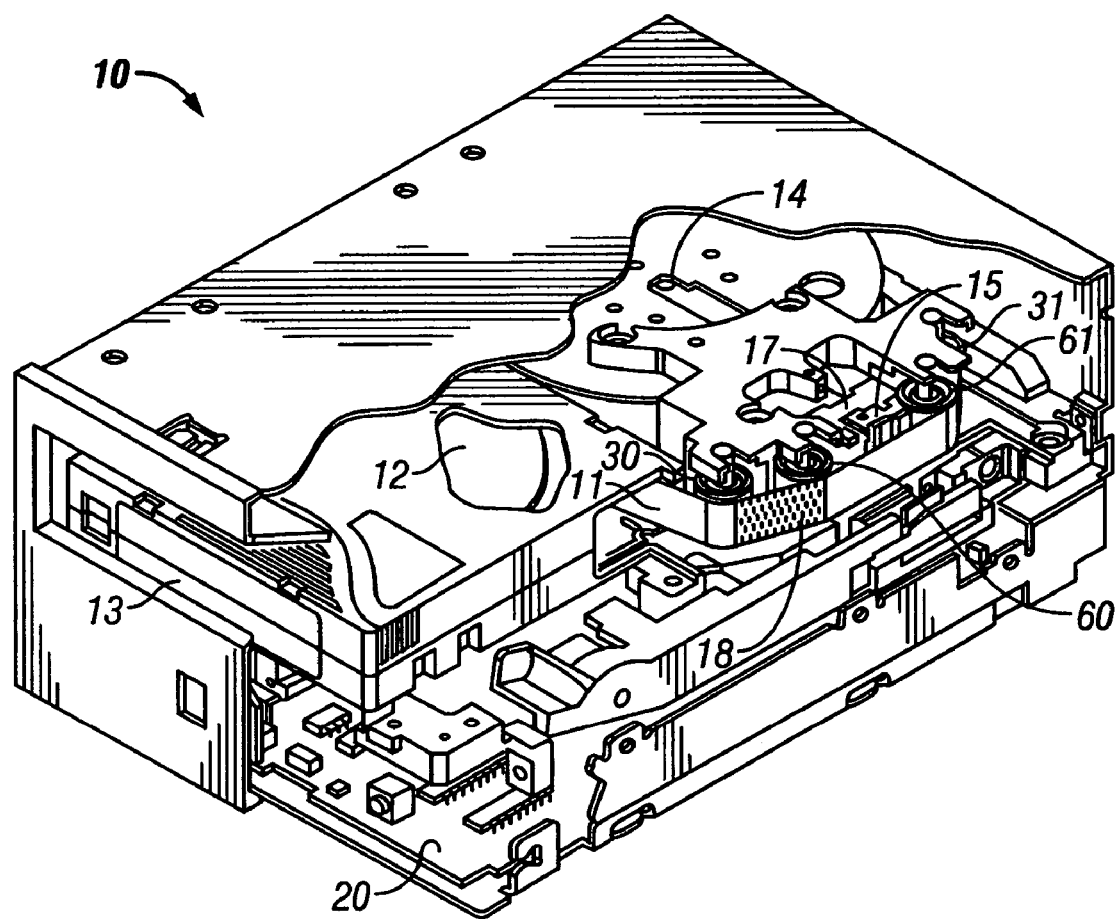
FIG. 1 is a partially cut away view of a tape drive implementing the present invention.
Figure 6:
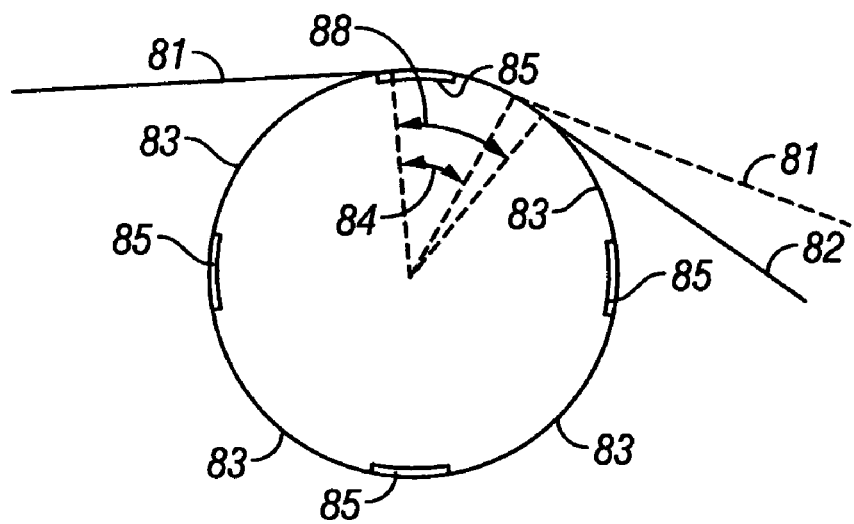
FIG. 6 is a cross sectional view of a tape guide roller in accordance with the present invention in another rotational position together with a tape.
Figure 7:
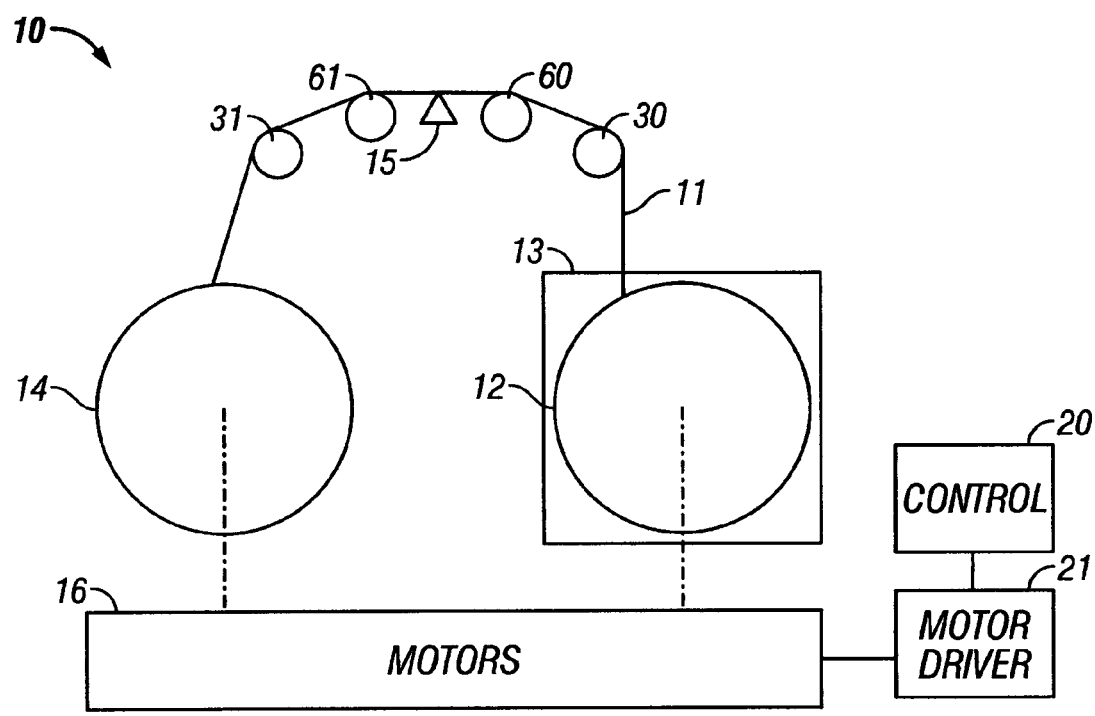
FIG. 7 is a diagrammatic illustration of the tape drive of FIG. 1.

Referring to FIGS. 1 and 6, a tape drive, such as a magnetic tape drive, is illustrated which implements the present invention. A magnetic tape 11 is translated along a tape path in a longitudinal direction of the tape from a supply reel 12 in a tape cartridge 13 to a take up reel 14, the reels comprising drive reels of a tape drive system which are operated by drive motors 16. The magnetic tape 11 is moved in the longitudinal direction across a tape head 15. The tape head may be supported and laterally moved by an actuator 17 of a track following servo system. The tape head 15, for example, a magnetic tape head, may comprise a plurality of read and write elements for reading and writing data with respect to the magnetic tape 11, and may have a servo sensor for sensing servo tracks or bands 18 recorded on the magnetic tape. The servo sensor may sense the lateral position of the magnetic tape and operate the servo system actuator to track follow the servo tracks or bands. The servo sensor may also detect the longitudinal position of the tape from the servo tracks or bands. The tape drive 10 additionally comprises a controller 20 which provides the electronics modules and processor to operate the tape drive, and a motor driver 21 to operate the drive motors 16.

Tape guide rollers 30, 31, 60 and 61 comprise a tape translation system to control the longitudinal movement of tape along a tape path which varies from a straight line.

The arrangement of the tape reels 12 and 14 is typically such that the tape reels are in the same plane, but are also at angles with respect to the tape path across the magnetic tape head. In addition, the angle of the tape as it is fed from one reel and as it is fed to another reel may be constantly changing as the tape is unwound from one reel and wound onto the other reel. Thus, the tape is wrapped around the outer tape guide rollers 30 and 31 to allow longitudinal movement of the tape in which the longitudinal direction of the tape is changed from the direction to or from a tape reel to the tape path across the magnetic tape head. The inner tape guide rollers 60 and 61 have a constant wrap angle and are positioned closer to the magnetic tape head 15, and typically provide lateral alignment of the magnetic tape 11 with the tape head.

Figure 2:
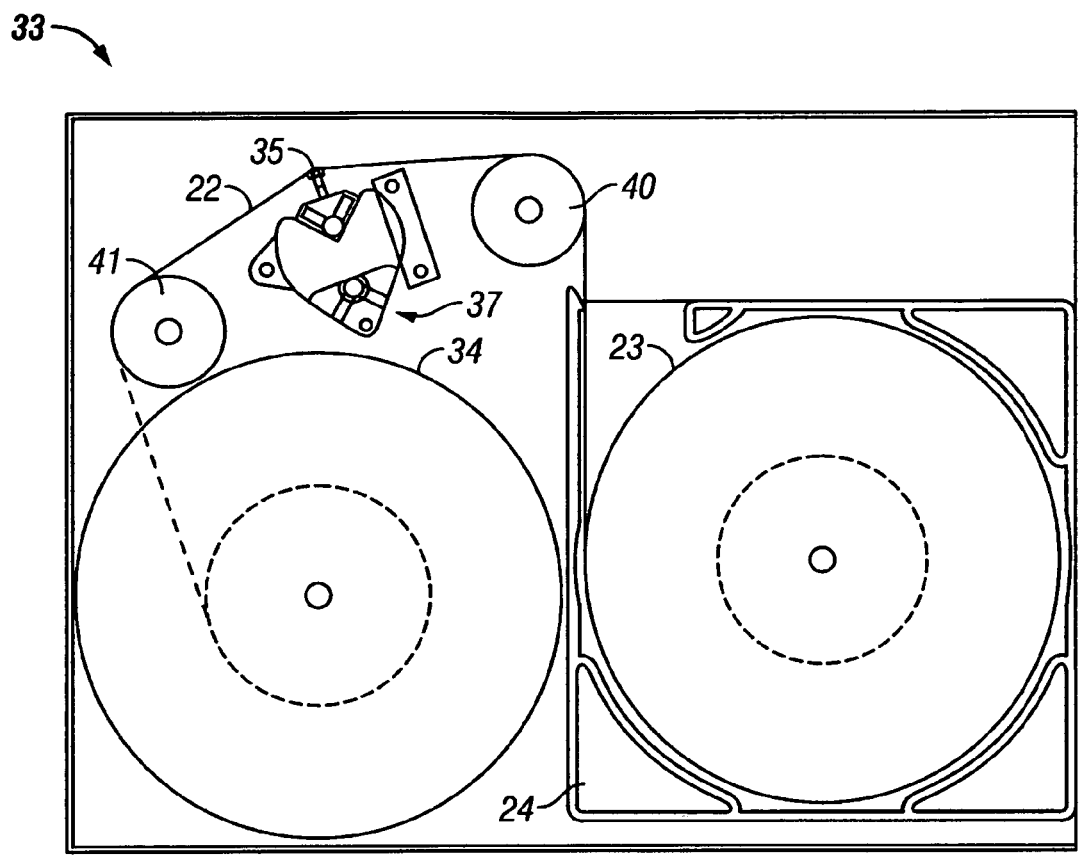
FIG. 2 is a diagrammatic illustration of an alternative tape drive implementing the present invention.

An alternative type of tape drive 33 is illustrated in FIG. 2, which also implements the present invention. A magnetic tape 22 is translated along a tape path in a longitudinal direction of the tape from a supply reel 23 in a tape cartridge 24 to a take up reel 34, the reels comprising drive reels of a tape drive system which are operated by drive motors. The magnetic tape 22 is moved in the longitudinal direction across a tape head 35 of a tape head assembly 37. The tape head 35, for example, a magnetic tape head, may comprise one or more read and write elements for reading and writing data with respect to the magnetic tape. The tape drive 33 additionally comprises a controller which provides the electronics modules and processor to operate the tape drive.

Tape guide rollers 40 and 41 control the longitudinal movement of tape along a tape path which varies from a straight line.

The arrangement of the tape reels 23 and 34 is also typical and such that the tape reels are in the same plane, but are also at angles with respect to the tape path across the magnetic tape head. In addition, the angle of the tape as it is fed from one reel and as it is fed to another reel may be constantly changing. Thus, the tape is wrapped around the tape guide rollers 40 and 41 to allow longitudinal movement of the tape in which the longitudinal direction of the tape is changed from the direction to or from a tape reel to the tape path across the magnetic tape head.

An example of a tape drive that may implement the present invention is the 3580 Ultrium tape drive of the International Business Machines Corporation.

FIGS. 3A and 3B and FIGS. 4A and 4B illustrate embodiments of tape guide rollers in accordance with the present invention which comprise a cylindrical barrel having a cylindrical peripheral surface comprising smooth cylindrical surface zones alternating in the circumferential direction about the cylindrical peripheral surface with non-smooth cylindrical surface zones. The tape guide rollers are configured for rotation, as is known to those of skill in the art, for example, about a central post with roller or ball bearings.

Figure 3A:
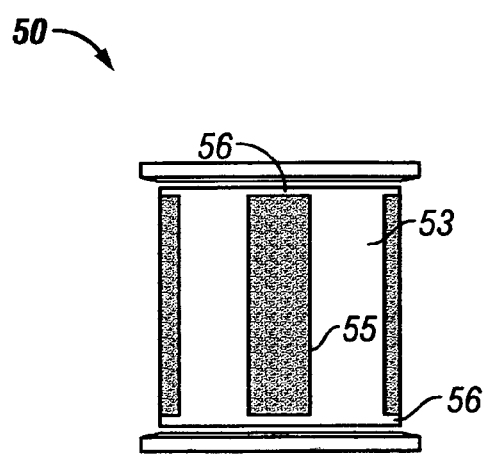
FIGS. 3A and 3B are isometric views illustrating one embodiment of tape guide rollers in accordance with the present invention, which may be employed in the tape drives of FIGS. 1 and 2.
Figure 3B:
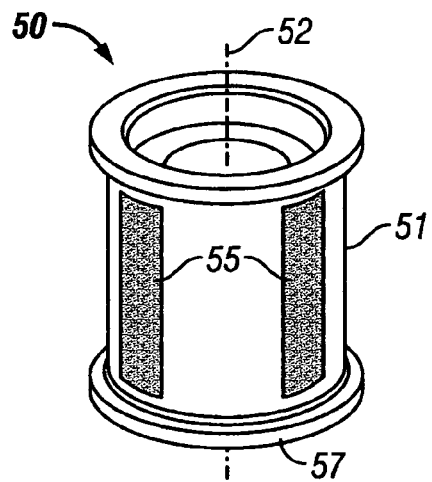

In FIGS. 3A and 3B, a tape guide roller 50 comprises a cylindrical barrel 51 having a central axis 52 perpendicular to the longitudinal direction of the tape, and having a cylindrical peripheral surface parallel to the central axis, the cylindrical peripheral surface comprising smooth cylindrical surface zones 53 alternating in the circumferential direction about the cylindrical peripheral surface with non-smooth cylindrical surface zones 55. In the example of FIGS. 3A and 3B, the non-smooth cylindrical surface zones comprise a textured surface. The textured surface may comprise a roughened or "bead blasted" surface.

Figure 4A:
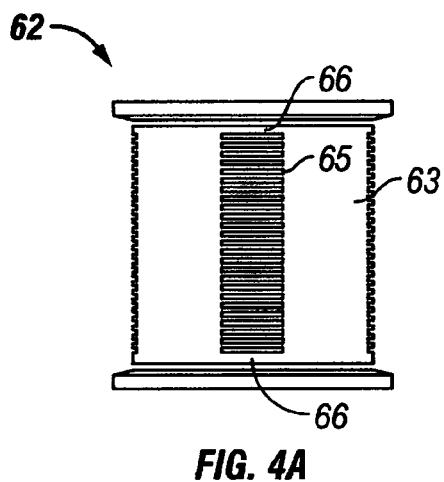
FIGS. 4A and 4B are isometric views illustrating an alternative embodiment of tape guide rollers in accordance with the present invention, which may be employed in the tape drives of FIGS. 1 and 2.
Figure 4B:
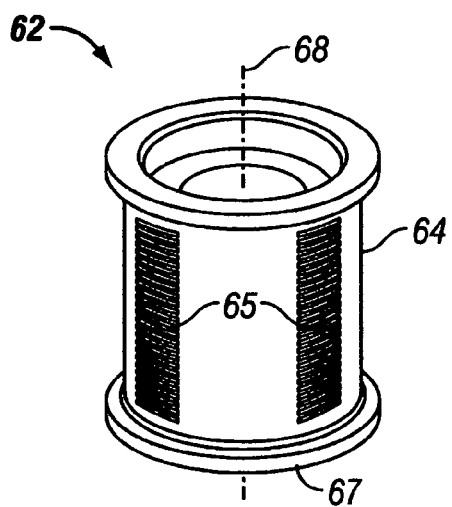

In FIGS. 4A and 4B, a tape guide roller 62 comprises a cylindrical barrel 64 having a central axis 68 perpendicular to the longitudinal direction of the tape, and having a cylindrical peripheral surface parallel to the central axis, the cylindrical peripheral surface comprising smooth cylindrical surface zones 63 alternating in the circumferential direction about the cylindrical peripheral surface with non-smooth cylindrical surface zones 65. In the example of FIGS. 4A and 4B, the non-smooth cylindrical surface zones comprise a grooved surface.

The grooved surface may also comprise textured surface areas.

In accordance with the present invention, the non-smooth cylindrical surface zones grip the tape more aggressively by allowing localized air bleeding. The added grip creates roller motion that is more likely to act to grip the tape sufficiently to have the tape rotate the roller barrel 51, 64 at a rotational rate that is synchronous with the tape motion, and that is maintained due to roller rotational momentum. The result is a near zero roller surface to tape relative motion, and reduction of frictional forces that create wear scarring on tape guide roller flanges 57, 67, and reduction of degradation of the tape edges and resultant debris. As the tape guide roller spins, the tape will contact the local non-smooth surface zones which act to collapse an air film that may be created in the smooth sections of the peripheral surface, and cause high traction of the tape with respect to the tape roller guide.

The non-smooth surface zones are separated by zones that are smooth. The smooth zones allow the tape to move laterally small distances to correct lateral displacements of the tape, should the tape be moved laterally against the tape roller guide flanges 57, 67. Without the smooth zones, the tape may be damaged if the tape were forced into a tape roller guide flange, for example by becoming buckled. Thus, the tape translation system incorporating tape guide rollers 50 or 62 tends to protect the tape from damage.

In the embodiments of FIGS. 3A and 3B and FIGS. 4A and 4B, smooth edges 56 and 66 completely surround the non-smooth cylindrical surface zones, and support the edges of the tape.

Figure 5:
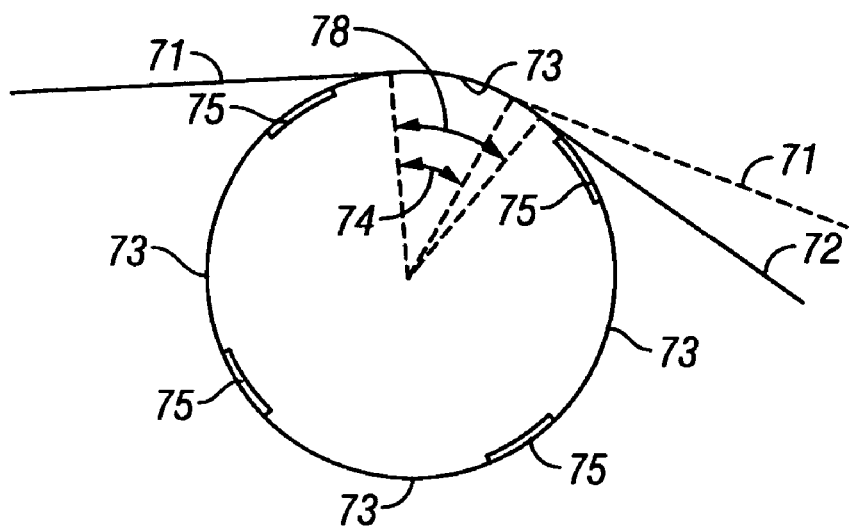
FIG. 5 is a cross sectional view of a tape guide roller in accordance with the present invention in one rotational position together with a tape.

Referring to FIG. 5, in one embodiment of the present invention, each of the smooth cylindrical surface zones 73 extends in the circumferential direction a distance greater than a wrap distance of the tape 71 in the circumferential direction formed by wrap angle 74. In this manner, a non-smooth cylindrical surfaces 75 is occasionally adjacent the tape, reducing the opportunity for the tape to slip. As discussed above with respect to the tape drives, the arrangement of the supply and take up tape reels is typically such that the angle of the tape as it is fed from one reel and as it is fed to another reel may be constantly changing as the tape is unwound from one reel and wound onto the other reel. Thus, the wrap distance may correspondingly be changing, for example, from a minimum wrap angle 74 of tape 71 to a maximum wrap angle 78 of tape 72, and the smooth cylindrical surface zones 73 are greater than the maximum wrap angle 78.

Referring to FIG. 6, in one embodiment of the present invention, each of the non-smooth cylindrical surface zones 85 extends in the circumferential direction a distance less than a wrap distance of the tape 81 in the circumferential direction formed by wrap angle 84. In this manner, one of the smooth cylindrical surfaces 83 is constantly adjacent the tape, so that the tape is more easily released from the tape guide roller in either direction of motion. As discussed above with respect to the tape drives, the arrangement of the supply and take up tape reels is typically such that the angle of the tape as it is fed from one reel and as it is fed to another reel may be constantly changing as the tape is unwound from one reel and wound onto the other reel. Thus, the wrap distance may correspondingly be changing, for example, from a minimum wrap angle 84 of tape 81 to a maximum wrap angle 88 of tape 82 and the non-smooth cylindrical surface zones 75 are less than the minimum wrap angle 84.

Referring to FIGS. 5 and 6, in one embodiment, the non-smooth cylindrical surface zones 75, 85 comprise high points of substantially the same radial distance as smooth cylindrical surface zones. In this manner, the speed of rotation of the tape guide roller is maintained substantially constant consistent with the tape speed due to reduced slippage, and, as the result of roller rotational momentum, without substantial acceleration or deceleration characteristics.

In a further embodiment, the distribution and size of the non-smooth cylindrical surface zones about the cylindrical peripheral surface may be varied in consideration of tape tension, tape speed, the amount of tape wrap, and the guide roller rotational drag characteristics.

Those of skill in the art will understand that changes may be made with respect to the layout of the tape guides, translation system, tape head system, and tape drive. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A tape guide roller configured for a tape translation system, said tape translation system configured to allow translation of a tape in a longitudinal direction of said tape and in circumferential direction about said tape guide roller, said tape guide roller comprising:
   a cylindrical barrel having a central axis perpendicular to said longitudinal direction of said tape, and having a cylindrical peripheral surface parallel to said central axis;
   said cylindrical peripheral surface comprising smooth cylindrical surface zones alternating in said circumferential direction about said cylindrical peripheral surface with non-smooth cylindrical surface zones, each of said non-smooth cylindrical surface zones comprising a defined rectangular continuous area extending in said circumferential direction and in the axial direction, and wherein each of said smooth cylindrical surface zones comprises a continuous area extending between two said non-smooth cylindrical surface zones in said circumferential direction a distance greater than a wrap distance of said tape in said circumferential direction.

2. The tape guide roller of claim 1, wherein each of said non-smooth cylindrical surface zones extends in said circumferential direction a distance less than a wrap distance of said tape in said circumferential direction.

3. The tape guide roller of claim 1, wherein said non-smooth cylindrical surface zones comprise high points of substantially the same radial distance as smooth cylindrical surface zones.

4. The tape guide roller of claim 1, wherein said non-smooth cylindrical surface zones comprise a textured surface.

5. The tape guide roller of claim 1, wherein said non-smooth cylindrical surface zones comprise a grooved surface.

6. The tape guide roller of claim 1, wherein smooth edges completely surround said non-smooth cylindrical surface zones.

7. A tape translation system configured to control movement of a tape in a longitudinal direction of said tape, comprising:
   a plurality of tape guide rollers positioned in said longitudinal direction of said tape, at least an outer two of said tape guide rollers configured to allow translation of a tape in a longitudinal direction of said tape and in a circumferential direction about said tape guide roller, said at least two outer tape guide rollers each comprising:
      a cylindrical barrel having a central axis perpendicular to said longitudinal direction of said tape, and having a cylindrical peripheral surface parallel to said central axis;
      said cylindrical peripheral surface comprising smooth cylindrical surface zones alternating in said circumferential direction about said cylindrical peripheral surface with non-smooth cylindrical surface zones, each of said non-smooth cylindrical surface zones comprising a defined rectangular continuous area extending in said circumferential direction and in the axial direction, and wherein each of said smooth cylindrical surface zones of said at least two outer tape guide rollers comprises a continuous area extending between two of said non-smooth cylindrical surface zones in said circumferential direction a distance greater than a wrap distance of said tape in said circumferential direction.

8. The tape translation system of claim 7, wherein each of said non-smooth cylindrical surface zones of said at least two outer tape guide rollers extends in said circumferential direction a distance less than a wrap distance of said tape in said circumferential direction.

9. The tape translation system of claim 7, wherein said non-smooth cylindrical surface zones of said at least two outer tape guide rollers comprise high points of substantially the same radial distance as smooth cylindrical surface zones.

10. The tape translation system of claim 7, wherein said non-smooth cylindrical surface zones of said at least two outer tape guide rollers comprise a textured surface.

11. The tape translation system of claim 7, wherein said non-smooth cylindrical surface zones of said at least two outer tape guide rollers comprise a grooved surface.

12. The tape translation system of claim 7, wherein smooth edges completely surround said non-smooth cylindrical surface zones of said at least two outer tape guide rollers.

13. A tape head system configured to read and/or write magnetic signals with respect to a magnetic tape, comprising:
   a magnetic tape head configured to read and/or write magnetic signals with respect to a magnetic tape that is translated across said magnetic tape head; and
   a plurality of tape guide rollers positioned in a longitudinal direction of said tape, at least an outer two of said tape guide rollers positioned at either side of said magnetic tape head in said longitudinal direction of said tape, said at least two outer tape guide rollers configured to translate said magnetic tape across said magnetic tape head in said longitudinal direction of said tape and in a circumferential direction about said tape guide roller, said at least two outer tape guide rollers each comprising:

a cylindrical barrel having a central axis perpendicular to said longitudinal direction of said tape, and having a cylindrical peripheral surface parallel to said central axis;

said cylindrical peripheral surface comprising smooth cylindrical surface zones alternating in said circumferential direction about said cylindrical peripheral surface with non-smooth cylindrical surface zones, each of said non-smooth cylindrical surface zones comprising a defined rectangular continuous area extending in said circumferential direction and in the axial direction, and wherein each of said smooth cylindrical surface zones of said at least two outer tape guide rollers comprises a continuous area extending between two said non-smooth cylindrical surface zones in said circumferential direction a distance greater than a wrap distance of said tape in said circumferential direction.

14. The tape head system of claim 13, wherein each of said non-smooth cylindrical surface zones of said at least two outer tape guide rollers extends in said circumferential direction a distance less than a wrap distance of said tape in said circumferential direction.

15. The tape head system of claim 13, wherein said non-smooth cylindrical surface zones of said at least two outer tape guide rollers comprise high points of substantially the same radial distance as smooth cylindrical surface zones.

16. The tape head system of claim 13, wherein said non-smooth cylindrical surface zones of said at least two outer tape guide rollers comprise a textured surface.

17. The tape head system of claim 13, wherein said non-smooth cylindrical surface zones of said at least two outer tape guide rollers comprise a grooved surface.

18. The tape head system of claim 13, wherein smooth edges completely surround said non-smooth cylindrical surface zones of said at least two outer tape guide rollers.

19. A magnetic tape drive system configured to translate a magnetic tape in a longitudinal direction along a tape path across a magnetic tape head, comprising:

a tape drive system configured to rotate tape reels to translate a magnetic tape in a longitudinal direction along said tape path; and a plurality of tape guide rollers positioned in a longitudinal direction of said tape along said tape path, at least an outer two of said tape guide rollers positioned at either side of said magnetic tape head in said longitudinal direction of said tape, said at least two outer tape guide rollers configured to translate said magnetic tape across said magnetic tape head in said longitudinal direction of said tape and in a circumferential direction about said tape guide roller, said at least two outer tape guide rollers each comprising:

a cylindrical barrel having a central axis perpendicular to said longitudinal direction of said tape, and having a cylindrical peripheral surface parallel to said central axis;

said cylindrical peripheral surface comprising smooth cylindrical surface zones alternating in said circumferential direction about said cylindrical peripheral surface with non-smooth cylindrical surface zones, each of said non-smooth cylindrical surface zones comprising a defined rectangular continuous area extending in said circumferential direction and in the axial direction, and wherein each of said smooth cylindrical surface zones of said at least two outer tape guide rollers comprises a continuous area extending between two said non-smooth cylindrical surface zones in said circumferential direction a distance greater than a wrap distance of said tape in said circumferential direction.

20. The magnetic tape drive system of claim 19, wherein each of said non-smooth cylindrical surface zones of said at least two outer tape guide rollers extends in said circumferential direction a distance less than a wrap distance of said tape in said circumferential direction.

21. The magnetic tape drive system of claim 19, wherein said non-smooth cylindrical surface zones of said at least two outer tape guide rollers comprise high points of substantially the same radial distance as smooth cylindrical surface zones.

22. The magnetic tape drive system of claim 19, wherein said non-smooth cylindrical surface zones of said at least two outer tape guide rollers comprise a textured surface.

23. The magnetic tape drive system of claim 19, wherein said non-smooth cylindrical surface zones of said at least two outer tape guide rollers comprise a grooved surface.

24. The magnetic tape drive system of claim 19, wherein smooth edges completely surround said non-smooth cylindrical surface zones of said at least two outer tape guide rollers.

* * * * *